US008224687B2

(12) United States Patent
Tavares et al.

(10) Patent No.: US 8,224,687 B2
(45) Date of Patent: *Jul. 17, 2012

(54) POINT-OF-SALE-BASED MARKET TRACKING AND REPORTING

(75) Inventors: Silvio Tavares, Atlanta, GA (US); Karen Homler, Dix Hills, NY (US)

(73) Assignee: First Data Corporation

( * ) Notice: Subject to any disclaimer, the term of this patent is extended or adjusted under 35 U.S.C. 154(b) by 0 days.

This patent is subject to a terminal disclaimer.

(21) Appl. No.: 13/327,593

(22) Filed: Dec. 15, 2011

(65) Prior Publication Data

US 2012/0089438 A1 Apr. 12, 2012

Related U.S. Application Data

(63) Continuation of application No. 12/758,397, filed on Apr. 12, 2010, now Pat. No. 8,195,500.

(51) Int. Cl.
*G06Q 30/00* (2012.01)
(52) U.S. Cl. ...................................... 705/7.29; 705/7.31
(58) Field of Classification Search .................. 705/7.29
See application file for complete search history.

(56) References Cited

U.S. PATENT DOCUMENTS

| 5,500,513 | A  |   | 3/1996  | Langhans et al.         |
|-----------|----|---|---------|-------------------------|
| 6,151,582 | A  | * | 11/2000 | Huang et al. ... 705/7.25|
| 6,633,851 | B1 | * | 10/2003 | Engler et al. ... 705/21 |
| 2001/0016819 | A1 |   | 8/2001  | Kolls                   |
| 2002/0116252 | A1 | * | 8/2002  | Saito et al. ... 705/10  |
| 2004/0225556 | A1 | * | 11/2004 | Willen et al. ... 705/10 |
| 2004/0230472 | A1 |   | 11/2004 | Venkat et al.           |
| 2005/0090911 | A1 | * | 4/2005  | Ingargiola et al. ... 700/36 |
| 2007/0083430 | A1 |   | 4/2007  | Summer                  |
| 2008/0033587 | A1 | * | 2/2008  | Kurita et al. ... 700/100 |
| 2008/0262900 | A1 | * | 10/2008 | Duffy et al. ... 705/10 |
| 2008/0270363 | A1 | * | 10/2008 | Hunt et al. ... 707/3   |
| 2009/0299536 | A1 |   | 12/2009 | Beekhuis                |
| 2010/0287029 | A1 | * | 11/2010 | Dodge et al. ... 705/10 |
| 2011/0035278 | A1 |   | 2/2011  | Fordyce, III et al.     |
| 2011/0035280 | A1 |   | 2/2011  | Fordyce, III et al.     |

(Continued)

OTHER PUBLICATIONS

Research and Markets: UK Retail Finance 2002. (Feb. 23). M2 Presswire,1. Retrieved Apr. 18, 2012, from ProQuest Newsstand.*

(Continued)

*Primary Examiner* — Peter Choi
*Assistant Examiner* — Stephanie Delich
(74) *Attorney, Agent, or Firm* — Kilpatrick Townsend & Stockton LLP

(57) ABSTRACT

Systems and methods are described for transforming actual aggregated data (e.g., transaction and terminal data) from a large number of POS terminals into market trend reports that include macro-level trend data and analyses. For example, POS datasets are aggregated from POS terminals distributed across many merchant outlet locations, each POS dataset including location data and transaction data for its respective POS terminal. A reporting request is received for a market trend report corresponding to a designated market over a designated timeframe. A market dataset is identified from the portion of the aggregated POS data corresponding to the designated timeframe and market. Unreliable portions of the data may be discarded. Market trend data is then calculated as a function of the reliable portion of the market dataset, and graphical report data is output as a function of the market trend data in response to the reporting request.

26 Claims, 13 Drawing Sheets

U.S. PATENT DOCUMENTS

| | | |
|---|---|---|
| 2011/0087519 A1 | 4/2011 | Fordyce, III et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0251870 A1 | 10/2011 | Tavares et al. |
| 2011/0251907 A1 | 10/2011 | Tavares et al. |

OTHER PUBLICATIONS

Retail marketing: From distribution to integration: International Journal of Research in Marketing 14 (1997), 103-124. Retrieved Apr. 18, 2012 from Elsevier.*

International Search Report and Written Opinion of PCT/US2011/032102 mailed on Oct. 25, 2011, 11 pages.

* cited by examiner

POINT-OF-SALE-BASED MARKET TRACKING AND REPORTING

CROSS-REFERENCES TO RELATED APPLICATIONS

This application is a continuation of U.S. patent application Ser. No. 12/758,397, filed Apr. 12, 2010, entitled POINT-OF-SALE-BASED MARKET TRACKING AND REPORTING, the disclosure of which is herein incorporated by reference.

FIELD

The present invention relates, in general, to market tracking and reporting and, more particularly, to market tracking and reporting using aggregated point-of-sale data.

BACKGROUND

Market trends may result from many types and levels of factors. For example, markets may be affected by various macro- and micro-economic trends, seasonal trends, social trends, corporate trends, etc. Each of these trends may, in turn, be affected by many other types of trends. As such, it may be difficult to develop meaningful data about many markets without supplementing large amounts of diverse types of market data with extensive amounts of data mining, analysis, and assumptions.

Typically, public and private entities may indirectly obtain market data through interviews and/or other techniques. For example, a government employee may contact representative merchant locations to ask about overall performance for a given timeframe (e.g., the past month). Investors may then obtain and analyze this indirect market information in making investment decisions.

These and other techniques, however, may provide limited market information. For example, interviewed merchants or merchant locations may provide inaccurate information, may not actually be representative of the market, etc. Further, delays in obtaining these types of market data may be undesirable for investors and/or other stakeholders.

BRIEF SUMMARY

Among other things, systems and methods are described for tracking and/or reporting market trend data according to point-of-sale (POS) data.

Embodiments use actual aggregated data (e.g., transaction and terminal data) from a large number of POS terminals to generate macro-level trends for merchants, merchant types, geographical regions, markets, market segments, etc. For example, POS datasets are aggregated from a number of POS terminals, each located at a merchant outlet location, such that each POS dataset includes location data and transaction data for its respective POS terminal. A reporting request is received for a market trend report corresponding to a designated market over a designated timeframe. A market dataset is identified from the portion of the aggregated POS data corresponding to the designated timeframe and market. Unreliable portions of the data may be discarded. Market trend data is then calculated as a function of the reliable portion of the market dataset, and graphical report data is output as a function of the market trend data in response to the reporting request.

In one set of embodiments, a system is provided for market reporting according to point-of-sale (POS) data. The system includes an aggregation subsystem, a data storage subsystem, a trend processing subsystem, and a reporting subsystem. The aggregation subsystem is in communication with a POS network having a number of POS terminals, and is configured to aggregate POS datasets from the POS terminals in the POS network. Each POS terminal is disposed at a merchant associated with terminal data indicating at least one of a number of merchant identifiers and at least one of a number of merchant classifiers, and each is configured to collect transaction data as a function of transactions effectuated via the POS terminal. The POS dataset for each of the POS terminals includes the terminal data and the transaction data for the respective POS terminal.

The data storage subsystem is in communication with the aggregation subsystem and is configured to store the aggregated POS data from one of the POS terminals in the POS network. The trend processing subsystem is in communication with the POS data store and is configured to generate a market trend for a market over a timeframe by: identifying a market dataset from the aggregated POS data, the market dataset including the POS datasets corresponding to the timeframe and to POS terminals having terminal data indicating a merchant classifier corresponding to the market; calculating a reliable portion of the market dataset as a function of the POS datasets in the market dataset; and generating the market trend as a function of the reliable portion of the market dataset. The reporting subsystem is in communication with the trend processing subsystem and is configured to output graphical report data as a function of the market trend generated by the trend processing system. The graphical report data is configured to be displayed on a user device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
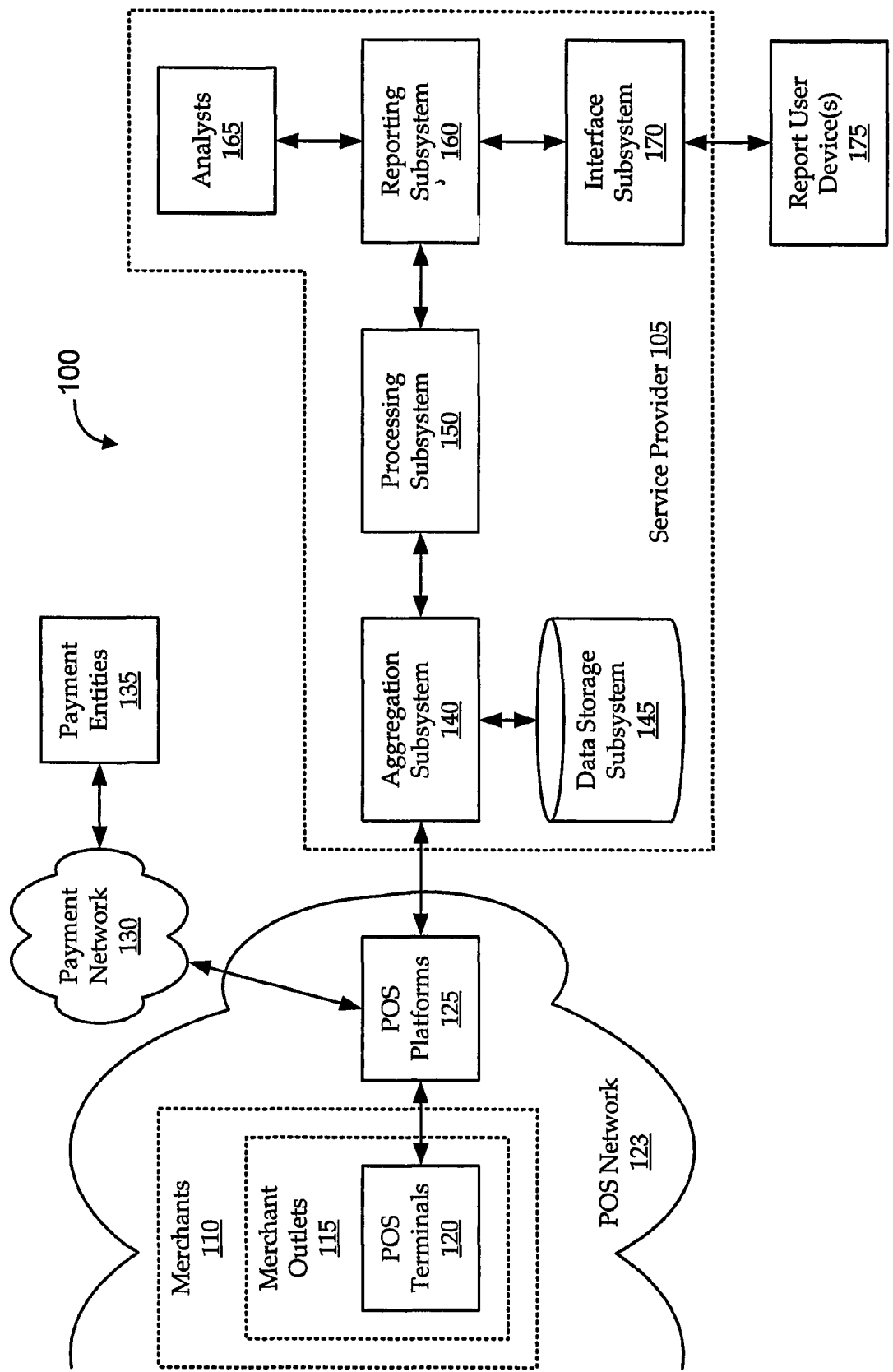
FIG. 1 shows a block diagram of an illustrative market network, according to various embodiments.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

It is well appreciated by investors, consumers, corporate officers, and other market participants that understanding various states and trends of markets can prove extremely valuable. It is also well appreciated by market participants that it may be difficult, or even impossible, to get a complete and accurate picture of many markets. For example, many market trends typically result from a large number of factors having varying types and magnitudes of effects on the market at issue. Further, many of these factors depend on data that may be difficult or impossible to obtain, including, for example, certain types of proprietary data, data from diverse and often-unreliable sources, etc.

In one typical example, market trends are generated by collecting data from a number of indirect sources. Public and private agencies may contact representative merchant locations to ask about overall performance for a given timeframe (e.g., the past month), various market reporters may gather rumors, speculation, and snippets of data from multiple sources, etc. Investors and analysts may then cull this indirect market information to make educated guesses about current and future market positions.

Notably, many typical techniques for gathering market data may provide limited and/or undesirable results. For example, interviews, rumors, and speculation all have a potential of generating inaccurate information, information that is not representative of the market (e.g., information restricted to a subset of market participants, to a particular geographic region, etc.), etc. Additionally, much of these types of information can only be gathered retrospectively (e.g., a merchant location may only be able to accurately answer questions about its performance for a month after the books have been closed for the month). As such, there may be delays in obtaining these data, which may be undesirable for investors and/or other stakeholders.

Among other things, embodiments described herein exploit actual transaction data aggregated from point-of-sale (POS) terminals to generate and report market trend data. In some embodiments, data from very large numbers of POS terminals are used to generate complete and accurate market trend data in a substantially timely fashion, for example in comparison to using interviews and/or other indirect techniques.

Turning first to FIG. 1, a block diagram of an illustrative market network 100 is shown, according to various embodiments. As illustrated, a service provider 105 is in communication with a number of POS terminals 120 that are in further communication with a payment network 130. Transactions are effectuated via the POS terminals 120 (e.g., using payment cards and/or other known forms of payment). In some embodiments, payment entities 135 interact with the payment network 130, for example, to perform various authorization and/or other functions relating to the transactions. Data from the transactions may be aggregated by the service provider 105 for use in generating market report data. In some embodiments, one or more report user devices 175 are in communication with the service provider 105, for example, to exploit the generated market report data.

Use of POS terminals 120 in effectuating transactions is well known in the art. As such, and for the sake of clarity, specific operations of POS terminals 120, POS networks 123, payment networks 130, payment entities 135, etc. will not be fully described herein. Rather, these and related terms and phrases should be broadly construed to include any transaction facilitating devices, systems, and techniques that are useable in the context of the various embodiments described herein.

For example, as used herein, POS terminals 120 may include cash registers, and any other alternative and/or peripheral devices or systems, including hardware and/or software, for effectuating transactions between a merchant and a consumer. POS platforms 125, as used herein, include any hardware and/or software for facilitating communications between one or more POS terminals 120 and the payment network 130 and/or service provider 105. In one embodiment, the POS platforms 125 include proprietary platforms, such as merchant platforms offered by First Data Corporation. In some embodiments, one or more interfaces are included with the POS terminals 120 and/or the POS platforms 125 to facilitate use by end consumers (e.g., cardholders, payors, etc.), salespersons, etc. The POS network 123, as used herein, is intended to broadly include any type of physical or virtual network, including one or more communications networks, corporate networks, etc. For example, a large number of globally distributed POS terminals 120 may, in some embodiments, be considered as part of a global POS network 123, even where some or all of the POS terminals 120 in the POS network 123 may not be in communication with one another.

As illustrated, some or all of the POS terminals 120 may be located at (e.g., inside, on the property of, in close proximity to, etc.) a merchant outlet 115. The merchant outlet 115 may be the only one, or one of many, locations of a particular merchant 110. For example, each merchant outlet 115 may be a physical store location, a franchise location, a branch office, virtual presence, etc. of a merchant 110. Of course, where the merchant 110 has only a single presence, the merchant outlet 115 and the respective merchant 110 may be one and the same.

Embodiments of the POS terminals 120 are configured to be associated with certain types of information and to collect certain types of information. For example, each POS terminal 120 may collect and/or be associated with terminal information and transaction information, as described more fully below. The transaction and terminal information may be sent to the POS platforms 125 for various types of processing. For example, some or all of the information may be sent to the payment network 130 for authorization by one or more payment entities 135 (e.g., issuing banks, payment card companies, etc.), and/or the information may be sent to the service provider 105.

Functions of the service provider 105 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 120 is received and aggregated by an aggregation subsystem 140. The aggregation subsystem 140 generates and stores aggregated POS datasets in a data storage subsystem 145. Embodiments of the data storage subsystem 145 may include any useful type of data storage. For example, the data storage subsystem 145 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 150. Embodiments of the processing subsystem 150 are configured to generate various types of market trend and/or other data for use by a reporting subsystem 160. Embodiments of the reporting system 160 use the data generated by the processing subsystem 150 to generate one or more types of market reports. In some embodiments, additional information is used to generate reports, including data received from one or more analysts 165 and/or other data sources.

The service provider 105 may further include an interface subsystem 170 to facilitate interaction with and/or delivery of reporting data generated by the reporting system. In some embodiments, one or more report user devices 175 interface with the service provider via the interface subsystem 170. For example, the report user devices 175 may request certain reports, receive report data for viewing, etc.

Figure 2:
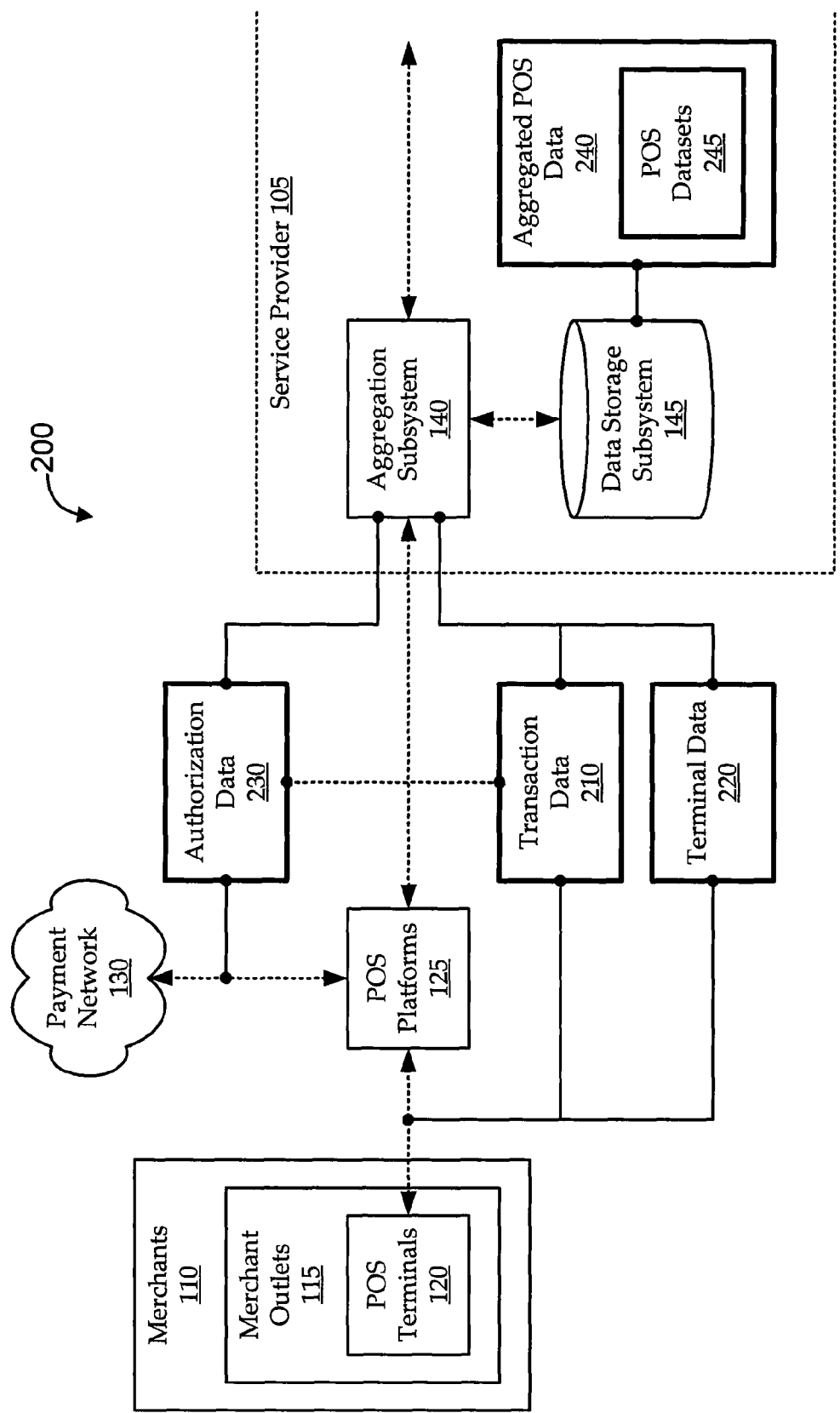
FIG. 2 shows a data flow diagram in the context of a first portion of a market network, according to various embodiments.
Figure 3:
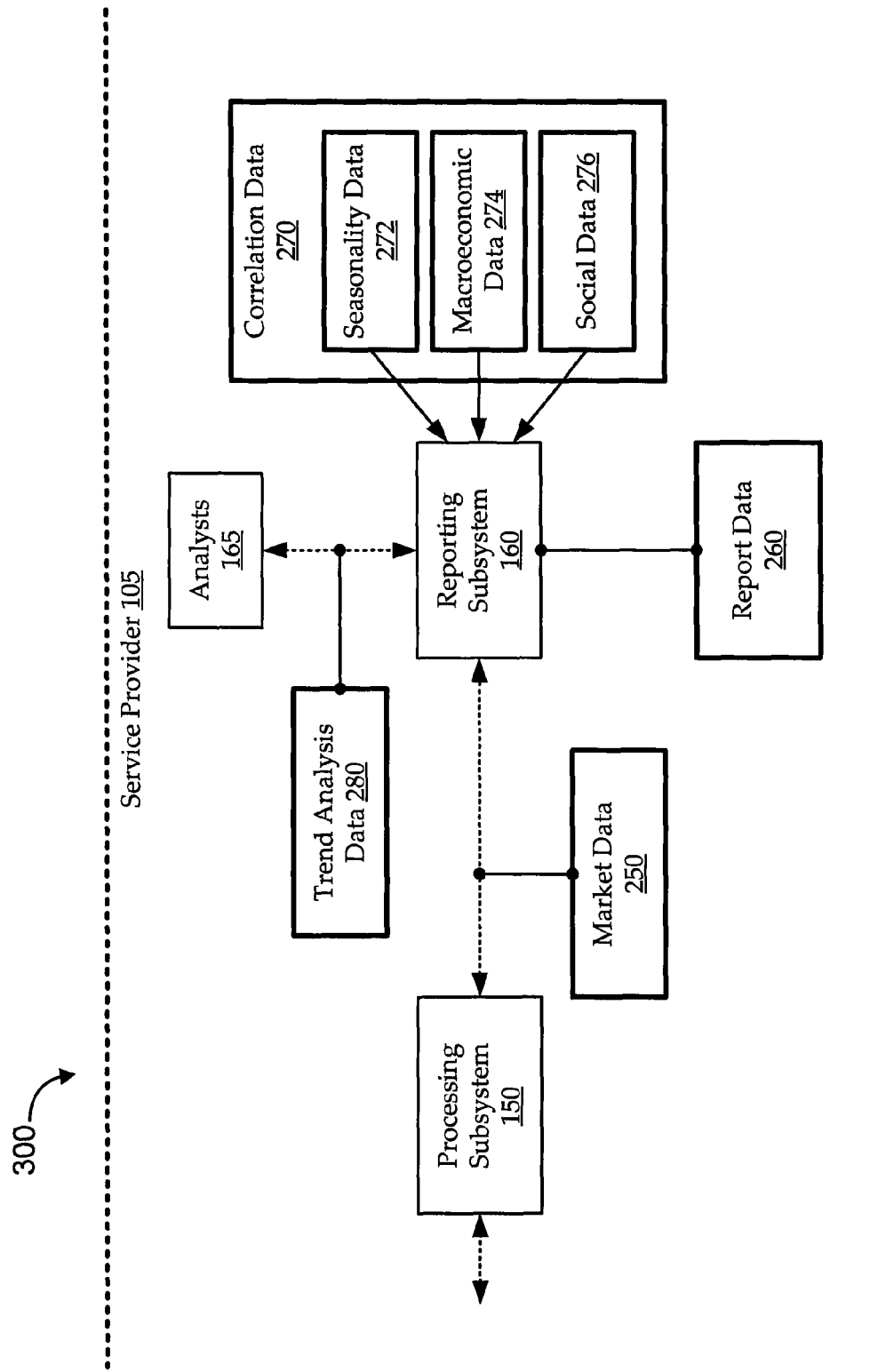
FIG. 3 shows a data flow diagram in the context of a second portion of a market network, according to various embodiments.
Figure 4:
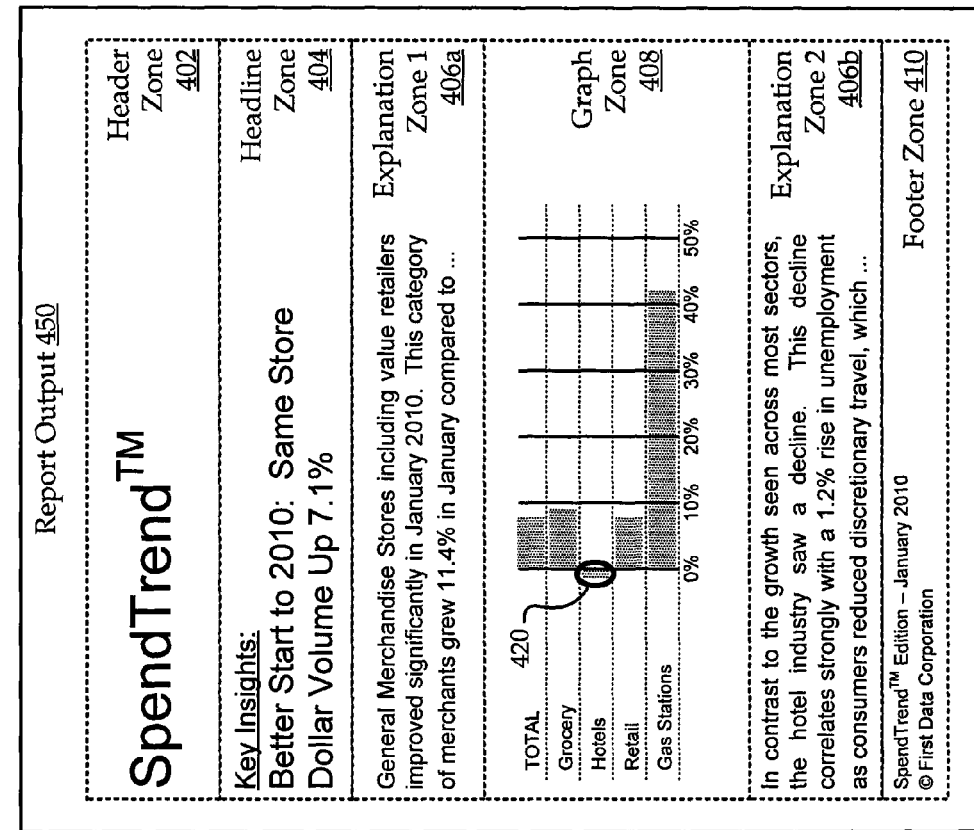
FIG. 4 shows a data flow diagram in the context of a third portion of a market network, according to various embodiments.
Figure 4:
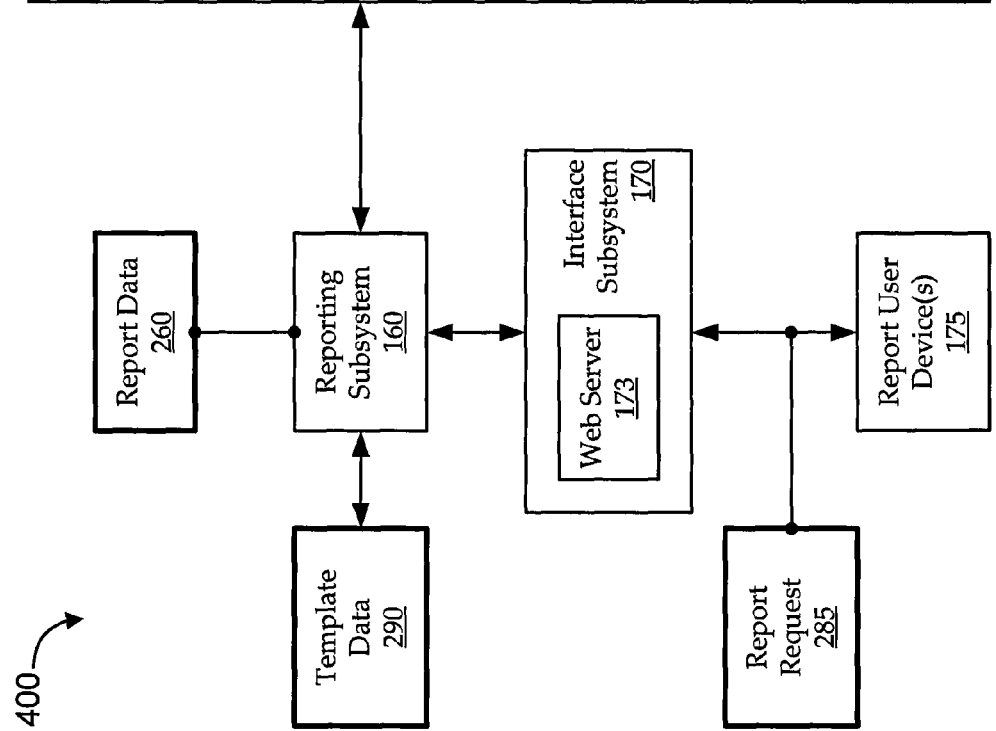

The functionality of various components of the market network 100, including the various subsystems of the service provider 105, will be described more fully below. For example, FIGS. 2-4 illustrate some embodiments of data flow through market networks, like the market network 100 of FIG. 1, each focusing on a portion of the data flow for the sake of clarity. Turning first to FIG. 2, a data flow diagram 200 is shown in the context of a first portion of a market network, according to various embodiments.

Embodiments of the data flow diagram 200 focus on generation and aggregation of POS data. As in a portion of the market network 100 of FIG. 1, a service provider 105 is in communication with a number of POS terminals 120 that are in further communication with a payment network 130. Embodiments of the POS terminals 120 are disposed at (e.g., located in or near) merchants 110 or merchant outlets 115. Transactions are effectuated via the POS terminals 120. Data from the transactions may be aggregated by an aggregation subsystem 140 of the service provider 105, which may be stored in a data storage subsystem 145.

Embodiments of the POS terminals 120 are configured to be associated with certain types of information and to collect certain types of information. While each POS terminal 120 may collect and/or be associated with many different types of information, some typical types of information can be classified into two general categories: transaction data 210 and terminal data 220. The terminal data 220 may include information relating to (e.g., identifiers corresponding to) the merchant 110 and/or particular merchant outlet 115 where the POS terminal 120 is located, network information (e.g., Internet protocol (IP) address, security protocols, etc.), configuration information (e.g., types of payment instruments accepted, software version, etc.), and/or any other information relating to the POS terminal 120 and not specifically to any transaction effectuated via the POS terminal 120.

It is worth noting that the terminal data 220 may indicate various characteristics of the POS terminals 120 in various ways. For example, various types of merchant classifiers may be used. In one embodiment, a merchant classifier code (MCC) defined by a government standard is used to identify each merchant. In other embodiments, a proprietary code may be used. Further, in some embodiments, each merchant is identified by a single classifier, even where the merchant operates in multiple markets. For example, a megastore may sell groceries, general merchandise, gasoline, insurance services, etc., but the merchant may be classified only using a "grocery" classification. In an alternate embodiment, the megastore may be classified using multiple classifiers. In still another embodiment, the megastore may be classified by both a single classifier (e.g., a default classifier, or a classifier chosen to comply with a particular standard) and by one or more other classifiers (e.g., according to proprietary classification systems).

The transaction data 210, on the contrary, may include any type of information relating to one or more transactions effectuated via the POS terminal 120. For example, the transaction data 210 may include timestamp information (e.g., a date and time, or time range, of one or more transactions), transaction value, fee and/or discount information, product category and/or description information, demographic information (e.g., relating to the payor), etc.

The transaction data 210 and terminal data 220 may be sent to the POS platforms 125 for various types of processing. In certain embodiments, some or all of the transaction data 210 may be sent from the POS platforms 125 to the payment network 130 for authorization. For example, transactions may be authorized, denied, canceled, etc. In some embodiments, the authorization process generates authorization data 230 that may or may not be included in the transaction data 210. In some embodiments, the transaction data 210, terminal data 220, and/or authorization data 230 are sent from the POS platforms 125 to the service provider 105. In various embodiments, information may be communicated to the service provider 105 periodically (e.g., every night), as a result of a trigger event (e.g., after a particular magnitude change in an economic indicator or social event), on demand (e.g., on request by the service provider 105), etc.

In some embodiments, the various types of data are sent to the aggregation subsystem 140 using standard formats and/or protocols. In other embodiments, the aggregation subsystem 140 is configured to process (e.g., parse) the data into a usable and/or desired format. The data may then be stored in the data storage subsystem 145 as aggregated POS data 240. In some embodiments, the aggregated POS data 240 is a collection of POS datasets 245. It is worth noting that the aggregated POS data 240 may be arranged in any useful way, for example, as an associative database, as a flat file, as sets of POS datasets 245, in encrypted or unencrypted form, in compressed or uncompressed form, etc.

Embodiments may then use the aggregated POS data 240 to generate market data. FIG. 3 shows a data flow diagram 300 in the context of a second portion of a market network, according to various embodiments. In some embodiments, the context of FIG. 3 includes various subsystems of the service provider 105. For example, as illustrated in the data flow diagram 200 of FIG. 2, aggregated POS data 240 may be generated by the aggregation subsystem 140 and stored in the data storage subsystem 145. This aggregated POS data 240 may then be used by other subsystems of the service provider 105 for further processing.

In some embodiments, the processing subsystem 150 uses the aggregated POS data 240 (e.g., either directly from the data storage subsystem 145 or via the aggregation subsystem 140) to generate market data 250. For example, the aggregated POS data 240 may include merchant type flags, merchant identifiers, merchant outlet identifiers, transaction amounts, numbers of transactions, payment types used, transaction types (e.g., sale, cash advance, return, etc.), transaction authorizations (e.g., authorize, decline, etc.), timestamps, etc. As used herein, the market data 250 may include any types of data useful in generating market analyses and/or reports that can be extracted and/or derived from the aggregated POS data 240.

Given these and/or other types of aggregated POS data 240, the market data 250 may include extracted or classified data, such as data extracted for a particular time period, data extracted for all records having the same store identifier, data classified by merchant type, data classified by location (e.g., merchant region, geographic region, etc.), data classified by dollar volume, data classified by average ticket price, etc. The market data 250 may additionally or alternately include trend data, such as data trends over a particular time period or compared to a baseline. The trends may look at time periods, payment types, merchants, merchant categories, geography, transaction volumes, ticket values, or any other useful (e.g., and derivable) characteristics of the aggregated POS data 240.

In some embodiments, the market data 250 is used by a reporting subsystem 160 of the service provider 105. Embodiments of the reporting subsystem 160 use the market data 250 to generate report data 260. The report data 260 may typically include data desired for generation of a market report, which may, for example, include data to support graphical representations of trends (e.g., for generation of bar graphs, pie charts, line graphs, spreadsheets, etc.), indications of events (e.g., for highlighting data, circling data, flagging data, etc.), etc.

While certain embodiments of the reporting subsystem 160 generate reporting data 260 only according to market data 250, other embodiments may use additional data. In some embodiments, the reporting subsystem 160 is configured to interface with one or more analysts 165 (e.g., human or machine). The analysts 165 may generate trend analysis data 280. For example, the trend analysis data 280 may include explanations, headlines, annotations, etc., for example, for adding value to an end user of the report data 260.

In some embodiments, the reporting subsystem 160 is in communication with one or more sources of correlation data 270. The correlation data 270 may include any type of data that could be useful in identifying correlations with and/or explanations of the market data 250. For example, embodiments of the correlation data 270 include seasonality data 272, macroeconomic data 274, and/or social data 276.

Embodiments of the seasonality data 272 may include information relating to time of year, number of workdays, number of weekends in a month, season, holidays, etc. For example, January revenue may correlate at least in part to the number of weekends in January each year. Embodiments of macroeconomic data 274 may include information relating to gross domestic product, personal bankruptcy, unemployment, total consumer debt, etc. For example, an increase in unemployment in a geographic region may correlate to an increase in fast food sales for that region. It is worth noting that the term "macroeconomic" is used herein only to distinguish from economic transaction data for a particular POS terminal 120. It will be appreciated that certain data, which may technically be classified as "microeconomic" in nature may be included in the macroeconomic data 274, such as economic trends relating to a particular subset of consumers, to particular externalities or market failures, to a particular merchant outlet or branch office, etc. Embodiments of social data 276 may include information relating to particular social trends, fads, military incursions, regulatory issues, political issues, etc. For example, a beef scare relating to a grocery store in a particular week may correlate to a drop in revenue for that grocery merchant for that week.

It will be appreciated that many other types of correlation data 270 are possible and may be received and/or derived from many types of sources. The correlation data 270 may also be collected periodically, based on historical data that was gathered or generated previously, etc. It will be further appreciated that the correlation data may be used by the analysts 165 in generating trend analysis data 280. For example, an analyst 165 may identify a correlation between the market data 250 and certain correlation data 270. The analyst 165 may then write up an explanation of the correlation, identify the correlation, do more research, etc. Other types and uses of correlation data 270, trend analysis data 280, and/or other data is described more fully below.

The report data 260 generated by the reporting subsystem 160 may be used in a number of different ways. Some of these ways are described with reference to FIG. 4. FIG. 4 shows a data flow diagram 400 in the context of a third portion of a market network, according to various embodiments. In some embodiments, the reporting subsystem 160 generates the report data 260 according to embodiments described with reference to FIG. 3. The report data 260 may then be used to generate one or more types of reports.

In some embodiments, the reporting subsystem 160 is in communication with an interface subsystem 170. Embodiments of the interface subsystem 170 are configured to provide an interface between the reporting subsystem 160 (and/or other subsystems of the service provider 105) and one or more consumers of the report data 260. For example, one or more end consumers may interact with the interface subsystem 170 via one or more report user devices 175. In various embodiments, the report user devices 175 may include any type of device capable of providing the desired report data 260 to the end consumer. For example, the report user devices 175 may include desktop and laptop computers, smart phones, personal digital assistants, e-readers, etc.

In some embodiments, the report user devices 175 interact with the interface subsystem 170 over a network (e.g., the Internet). These interactions may be facilitated in certain embodiments by a web server 173 in the interface subsystem 170. Some embodiments of the interface subsystem 170 may further include interface elements for various functions, such as authorization (e.g., login elements, encryption elements, etc.), graphical user interface handling, query handling, etc.

Embodiments of the interface subsystem 170 are used to facilitate provision of a report output 450 (e.g., a graphical report product) to one or more report user devices 175. In certain embodiments, the report user devices 175 can provide report requests 285 to the reporting subsystem 160 via the interface subsystem 170. For example, the report requests 285 may include one or more queries and/or other information for generating a report from the report data 260. Alternately, the report requests 285 may be issued after a report output 450 has already been generated, for example, to filter, refine, update, reformat, or otherwise affect the report output 450. In certain embodiments, report outputs 400 are generated without allowing for any report requests 285 before or after the report generation. Further, in some embodiments, report outputs 400 are generated according to automatically generated report requests 285. For example, a subscriber of a reporting service may have certain preferences (e.g., selected preferences, preferences based on the subscriber's portfolio, etc.), which may be used to decide what information is presented in a report output 450 and/or in what form.

In some embodiments, the report output 450 is also affected by template data 290. Depending on the type of output, the template data 290 may include any useful formatting or presentation information. For example, the template data 290 may include a style sheet, font information, margin information, graphics, etc. In certain embodiments, the template data 290 defines certain zones on all or part of the report output 450. Each zone may be dependent on other zones or independent, it may be automatically filled with report data or left open for manual input, or used in any other useful way.

In the illustrated embodiment of FIG. 4, the report output 450 includes 6 zones: a header zone 402, a headline zone 404, a first explanation zone 406a, a graph zone 408, a second explanation zone 406b, and a footer zone 410. These zones are intended only for illustration and should not be construed as limiting in any way. The header zone 402 and the footer zone 410 may include header and footer information, respectively. For example, the report output 450 may include a page header with logos, etc., copyright notices, edition information, etc. The headline zone 404 is illustrated to include a headline for the page. For example, the headline may point out a key insight illustrated by the other report data 260 shown on the page. The first explanation zone 406a is illustrated to include a general explanation to support the headline shown in the headline zone 404. For example, the first explanation zone 406a may include additional data and details relating to the key insight, trends, etc., and may provide an introduction to other information on the page. The graph zone 408 may include a graphical representation of a certain portion of the market data 250 (e.g., data relating to the key insight). The second explanation zone 406b is illustrated to explain and further support data from the graph zone 408, the first explanation zone 406a, etc.

In the example illustrated, market data 250 from January 2010 illustrates that same store dollar volumes are up 7.1-percent, as noted in the headline zone 404. The first explanation zone 406a, second explanation zone 406b, and graph zone 408 support this headline. For example, the bar graph in the graph zone 408 shows dollar volume growth for January 2010. As shown, grocery and retail are up around ten-percent, hotels are down around two-percent, and gas stations are up over forty-percent.

It is worth noting that the data in various embodiments may be focused on same store performance. As used herein, "same store" data generally refers to data aggregated from either an identical set of POS terminals 120 or from a statistically insignificant change in a sample set. For example, as discussed above, the market data 250 is derived using actual data from actual transactions effectuated via actual POS terminals 120. As such, real-world changes in the number of POS terminals 120 may have a noticeable effect on generated data if not properly accounted for.

Suppose, for example, that thirty new merchant outlets 115 open for a particular merchant 110 over a single year, and each merchant outlet 115 has an average of four POS terminals 120. The aggregated POS data 240 may show a large increase in dollar volume over that time period. For certain market reports, that information may be useful. For example, certain investors may be interested in the overall growth of that particular merchant's 110 dollar volume over the timeframe. For other market reports, however, it may be desirable to have an "apples-to-apples" comparison from one timeframe to another. For example, the overall growth may provide little or no information about representative growth of particular stores, of particular markets, etc.

As such, it may be desirable to generate reports based on a "same store" analysis. For example, it may be desirable to generate market data for substantially the same store sample set over two different timeframes. Notably, this and/or other functionality may include removal of irrelevant and/or unreliable data (e.g., or identification of relevant and/or reliable data. As such, certain embodiments generate a reliable portion of the market data 250 for use in generating the report data 260.

In one embodiment, when the aggregated POS data 240 shows insufficient data over the timeframe of interest (e.g., a particular POS terminal 120 has only been collecting transaction data 210 for a portion of the timeframe), the data may be removed from the analytical dataset. In another embodiment, statistical analyses may be performed to determine whether to use certain data. For example, market data 250 may be generated with and without certain data, and the differences may be analyzed to determine whether they are significant. Where the differences are significant, the data may be discarded and/or further analysis may be performed to determine why the difference is significant (e.g., and whether that significant difference would be worth reporting as part of the report data 260).

Notably, the report output 450 may further include various types of indications. In one embodiment, when data is discarded, it may still be included in the report data 260 and indicated as such. For example, a line of a spreadsheet may be struck through, or an asterisk may be included, to indicate that insufficient data was available. In other embodiments, indications are used to highlight or otherwise indicate trend events.

As used herein, trend events generally include any data point, data range, trend result, etc. that is identified as being potentially of interest. For example, as discussed above, various types of trend analysis data 280 and/or correlation data 270 may be used to identify correlations and other trend events. Trend events may be indicated in any useful way. For example, as illustrated in FIG. 4, a trend event indicator 420 is shown on the graph in the graph zone 408. The trend event indicator 420 is illustrated as a circle around the portion of the graph showing negative growth for the hotel industry. Of course, any type of indicator may be used, for example, including a color, shading, typeface, font, flags, highlighting, text, icons, etc.

While not indicated, other reporting and display techniques may be used to enhance the look, feel, usefulness, etc. of the report output 450. In one embodiment, the report output 450 is configured to be displayed through a web browser or similar interface using a report user device 175. A user may interact with the report output 450 using menus, buttons, links, and/or other navigation elements. The navigation may allow the user, for example, to jump between sections of the report output 450, to show or hide elements (e.g., the second explanation zone 406b), to dynamically process (e.g., filter, sort, etc.) charted data, to reformat the page layout, etc.

Figure 5:
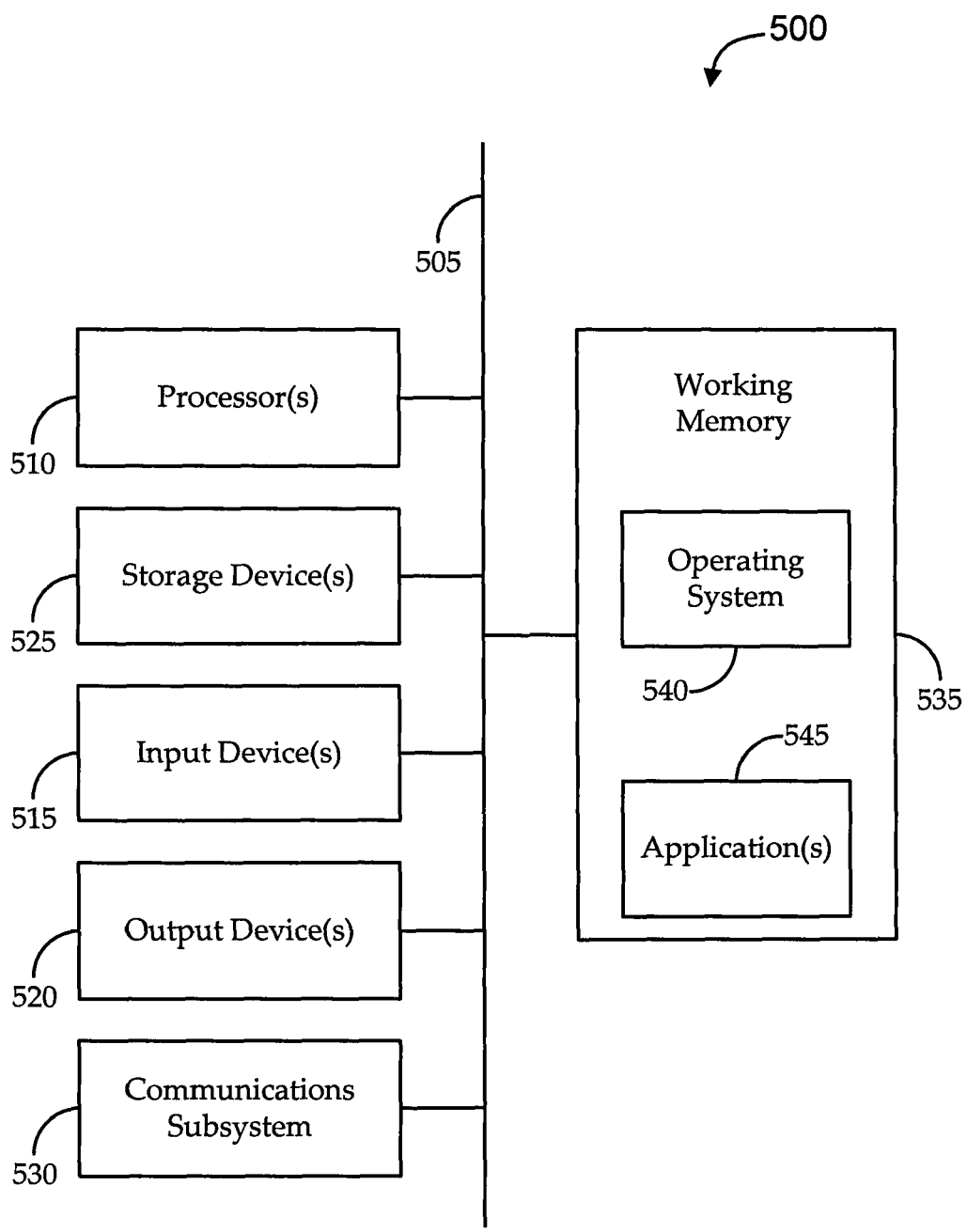
FIG. 5 shows an illustrative computational system for performing functionality to facilitate implementation of embodiments described herein.

As discussed above, the various subsystems of the service provider 105 may be implemented in hardware and/or software. In some embodiments, one or more computational systems are used, having instructions stored in memory that can be executed to cause processors and/or other components to perform certain methods (e.g., by implementing functionality of one or more of the subsystems). FIG. 5 shows an illustrative computational system 500 for performing functionality to facilitate implementation of embodiments described herein. For example, components of the computational system 500 may be used to implement functionality of one or more subsystems of the service provider 105. It should be noted that FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computational system 500 is shown to include hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 500 to perform methods of the invention. According to a set of embodiments, some or all of the procedures of such methods are performed by the computational system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

It will be appreciated that the systems described with reference to FIGS. 1-5, including the computational system 500 of FIG. 5, may be used to implement a number of methods. Some of these methods are discussed with reference to FIGS. 6-9. For the sake of clarity, embodiments of the methods may be discussed with reference to the illustrative system components of FIGS. 1-5. It will be appreciated that these descriptions should not be construed as limiting the scope of the methods or of the components described with reference to the methods.

Figure 6:
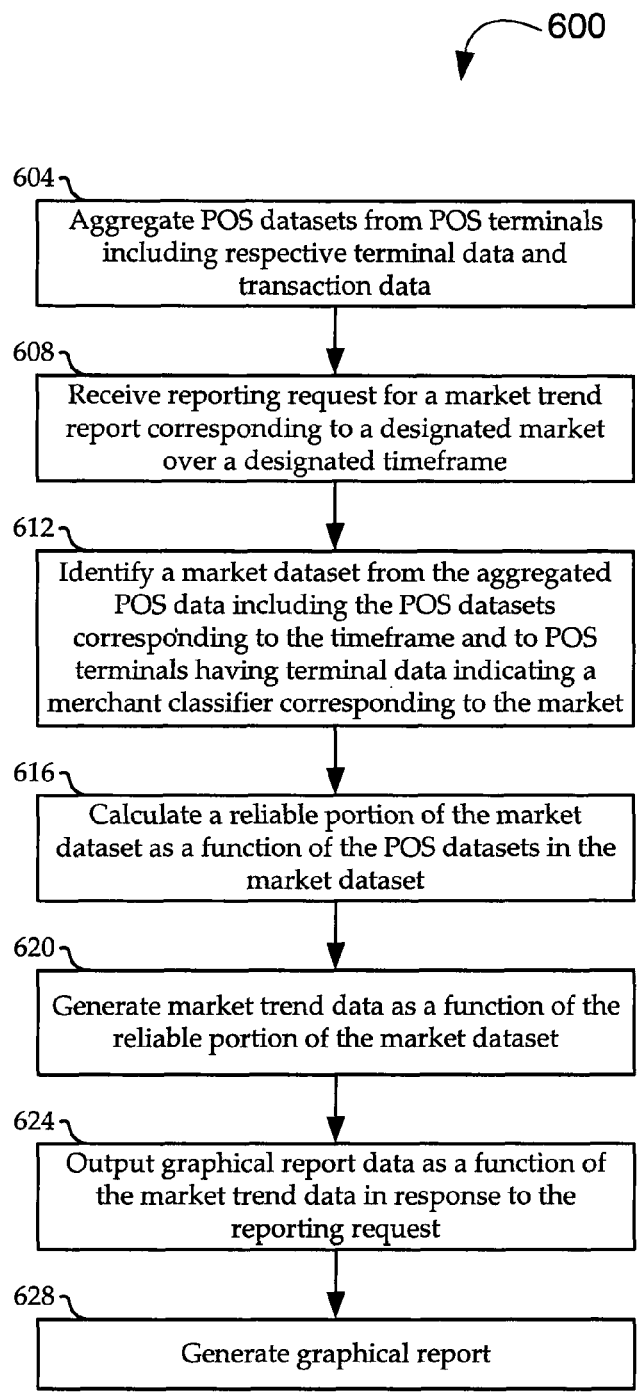
FIG. 6 shows a flow diagram illustrating a method for generating a graphical report, according to various embodiments.

FIG. 6 shows a flow diagram illustrating a method 600 for generating a graphical report, according to various embodiments. The method 600 begins at block 604 by aggregating POS datasets from POS terminals. For example, the aggregation subsystem 140 of the service provider 105 may be used to generate aggregated POS data 240 from a number of POS terminals 120. The aggregated POS data 240 may include transaction data 210, terminal data 220, and/or authorization data 230.

In some embodiments, at block 608, a request is received for a market trend report. The requested market trend report may correspond to a designated timeframe, a designated market, and/or any other designations. For example, the requested report may designate the hotels market over the past twelve months. Alternately, the requested report may designate all markets for the northwest region of the United States over the past sixty days. In various embodiments, the request may originate from a user using a report user device 175 via an interface subsystem 170, via a computer-generated request for updating a website or generating a periodic mailing, etc.

At block 612, a market dataset may be identified or generated from the aggregated POS data 240, for example, according to the request received in block 608. In some embodiments, market data 250 is generated from the aggregated POS data 240 including the POS datasets 245 corresponding to the designated timeframes) and to POS terminals 120 having terminal data 220 indicating a merchant classifier corresponding to the designated market(s).

As discussed above, it may be desirable to use only a reliable portion of the market dataset identified or generated in block 612. For example, POS datasets 245 from POS terminals 120 having transaction data 210 for only a portion of the timeframe may be ignored or treated differently (e.g., displayed with special indications and not used in calculating certain trends). At block 616, a reliable portion of the market dataset may be calculated as a function of the POS datasets in the market dataset. For example, only same store data, only data having a statistically insignificant variability from a baseline, etc. may be included in the reliable portion.

At block 620, market trend data may be generated as a function of the reliable portion of the market dataset. In some embodiments, additional data is generated and/or collected, such as correlation data 270, trend analysis data 280, template data 290, etc. Graphical report data may then be generated and output at block 624 as a function of the market trend data (e.g., in response to the reporting request received in block 608). In some embodiments, the graphical report data is used to generate a graphical report at block 628.

It will be appreciated that various modifications may be made to the method 600 without departing from the scope of embodiments. Also, various embodiments of sub-processes may be used to implement certain process blocks of the method 600. Embodiments of some of these sub-processes are described with reference to FIGS. 7-9.

Figure 7A:
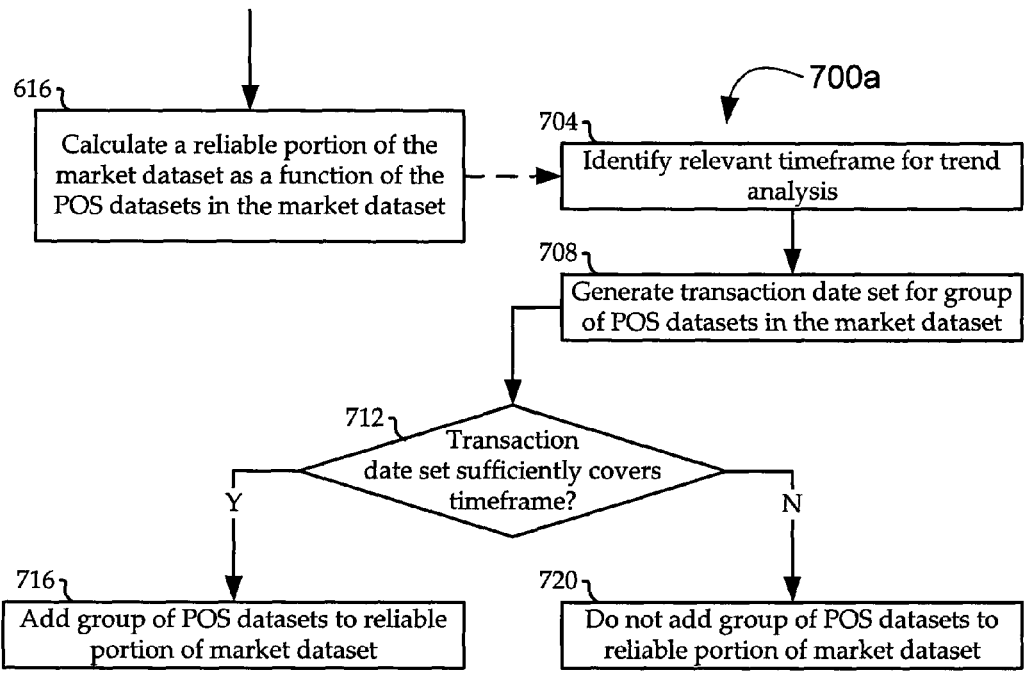
FIGS. 7A and 7B show flow diagrams of two illustrative methods for calculating a reliable portion of the market dataset, according to various embodiments.
Figure 7B:
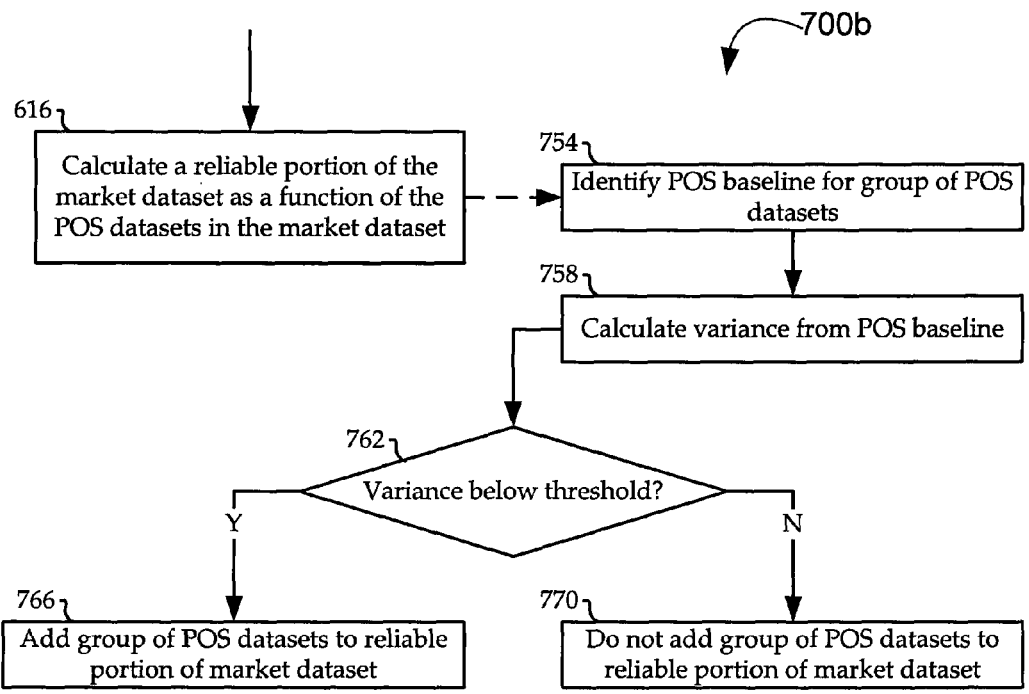

FIGS. 7A and 7B show flow diagrams of two illustrative methods 700 for calculating a reliable portion of the market dataset, according to various embodiments. Embodiments of the method 700a of FIG. 7A begin, as one embodiment of block 616 of the method 600 of FIG. 6, at block 704 by identifying a relevant timeframe for analysis. At block 708, the market data 250 (e.g., or POS datasets 245 that are used as part of the market data 250) are evaluated to determine a transaction date set. The transaction date set indicates the set of transaction dates (e.g., a date range, transactions per date, etc.) covered by the transactions included in the market data 250.

At block 712, a determination may be made as to whether the transaction date set sufficiently covers the timeframe of interest. In one embodiment, the transaction date set is evaluated only to see if data is available from the beginning and the end of the time frame. In other embodiments, techniques are used to determine if enough transaction data 210 is available for all or part of the timeframe. For example, it may be desirable to only treat the data as reliable when a certain average transaction density is seen across the entire timeframe.

If it is determined at block 712 that the transaction date set sufficiently covers the timeframe of interest, the corresponding POS datasets 245 (e.g., or data derived from the respective POS datasets 245) may be added to (e.g., or may not be removed from) the reliable portion of the market data 250 at block 716. If it is determined at block 712 that the transaction date set does not sufficiently cover the timeframe of interest, the corresponding POS datasets 245 (e.g., or data derived from the respective POS datasets 245) may not be added to (e.g., or may be removed from) the reliable portion of the market data 250 at block 720.

Embodiments of the method 700b of FIG. 7B begin, as another embodiment of block 616 of the method 600 of FIG. 6, at block 754 by identifying a POS baseline for a group of POS datasets 245. For example, if certain POS terminals 120 were used in certain merchant outlets 115 in January 2009, data from those POS terminals 120 may be used as the baseline for a same store report for January 2010. At block 758, a statistical variation (e.g., an amount of variation) may be calculated between the POS baseline and the market data 250. For example, it may be determined that a certain amount of change is allowed from the baseline without considering the new data unreliable.

At block 762, a determination may be made as to whether the amount of variation is below a certain allowable threshold. If it is determined at block 762 that the amount of variation is below the threshold, the corresponding POS datasets 245 (e.g., or data derived from the respective POS datasets 245) may be added to (e.g., or may not be removed from) the reliable portion of the market data 250 at block 766. If it is determined at block 762 that the amount of variation is below the threshold, the corresponding POS datasets 245 (e.g., or data derived from the respective POS datasets 245) may not be added to (e.g., or may be removed from) the reliable portion of the market data 250 at block 770.

Figure 8:
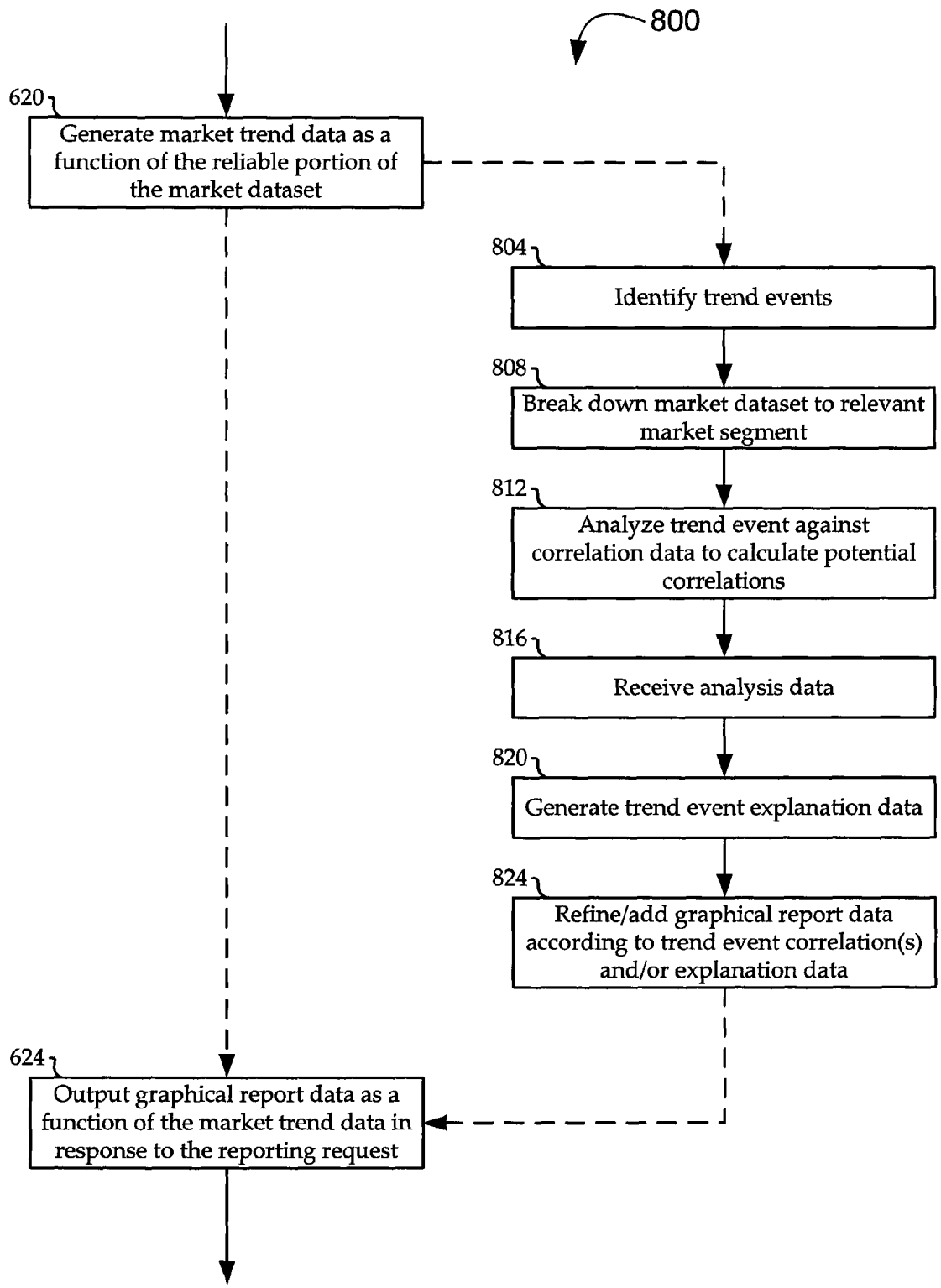
FIG. 8 shows a flow diagram of an illustrative method for generating market trend data, according to various embodiments.

Once the reliable portion of the market data 250 has been generated (e.g., by one of the methods 700 of FIG. 7A or 7B, or by some other method), it may be desirable to generate market trend data accordingly. FIG. 8 shows a flow diagram of an illustrative method 800 for generating market trend data (e.g., report data 260), according to various embodiments. Embodiments of the method 800 begin at block 804, as one embodiment of block 620 of the method 600 of FIG. 6, by identifying one or more trend events, as described above.

At block 808, the one or more trend events may be analyzed according to relevant market data 250 (or relevant data from the reliable portion of the market data 250). In one embodiment, the market data 250 is broken down by market segment for a relevant timeframe. For example, the reliable portion of the market data 250 may be filtered such that only merchants in the gasoline classification are analyzed. In certain embodiments, breaking down the market data 250 may include identifying relevant trend events from block 804 and their corresponding market data 250 from block 808.

The trend events identified in block 804 may then be analyzed against correlation data 270 (e.g., and/or any other useful types of data) in block 812 to calculate (e.g., and/or otherwise identify) potential correlations. For example, a statistically significant correlation may be found between a rise in same store average ticket value for merchants in a region and a rise in median home prices for the same region. In some embodiments, other data, like trend analysis data 280, may be received at block 816. The correlation data 270, trend analysis data 280, identified trend events, identified correlations, etc. may be used in block 820 to generate trend explanations. For example, the trend explanations may include auto-generated text, text supplied by analysts 165, etc.

It is worth noting that trend explanations may include a market driver analysis. For example, after identifying a trend event in block 804, a human or machine-implemented analyst may determine whether the trend event is legitimate (e.g., not simply evidence of an anomaly, mismatch, mathematical error, data error, etc.). The breakdown of the data in block 808 may include breaking down the data by market and then by merchant to determine what contributory effect each merchant may have on a trend or a particular trend event. The contributory effect of the particular merchant may be used to help explain trends, trend events, etc.

For example, suppose fast food sales show a small decline in March. A market driver analysis shows that a fast food chain called Burger Hut had a statistically large contributory impact on the trend event. Correlation data 270 indicates that Burger Hut was involved in a meat scare during a week in March, and aggregated POS data 240 supports a precipitous drop in sales for that week across Burger Hut merchant outlets 115. The data may justify a trend explanation stating that the small decline for the industry should be ignored, as the major contributing factor was a single meat scare for a single merchant, which has since been resolved.

Some or all of the data used in and generated by block 820 may then be used to affect graphical report data 260 in block 824. For example, the graphical report data 260 may be updated, refined, supplemented, etc. according to the trend event correlations, trend explanations, etc. The graphical report data 260 may then be output, for example, according to block 624 of the method 600 of FIG. 6.

Figure 9:
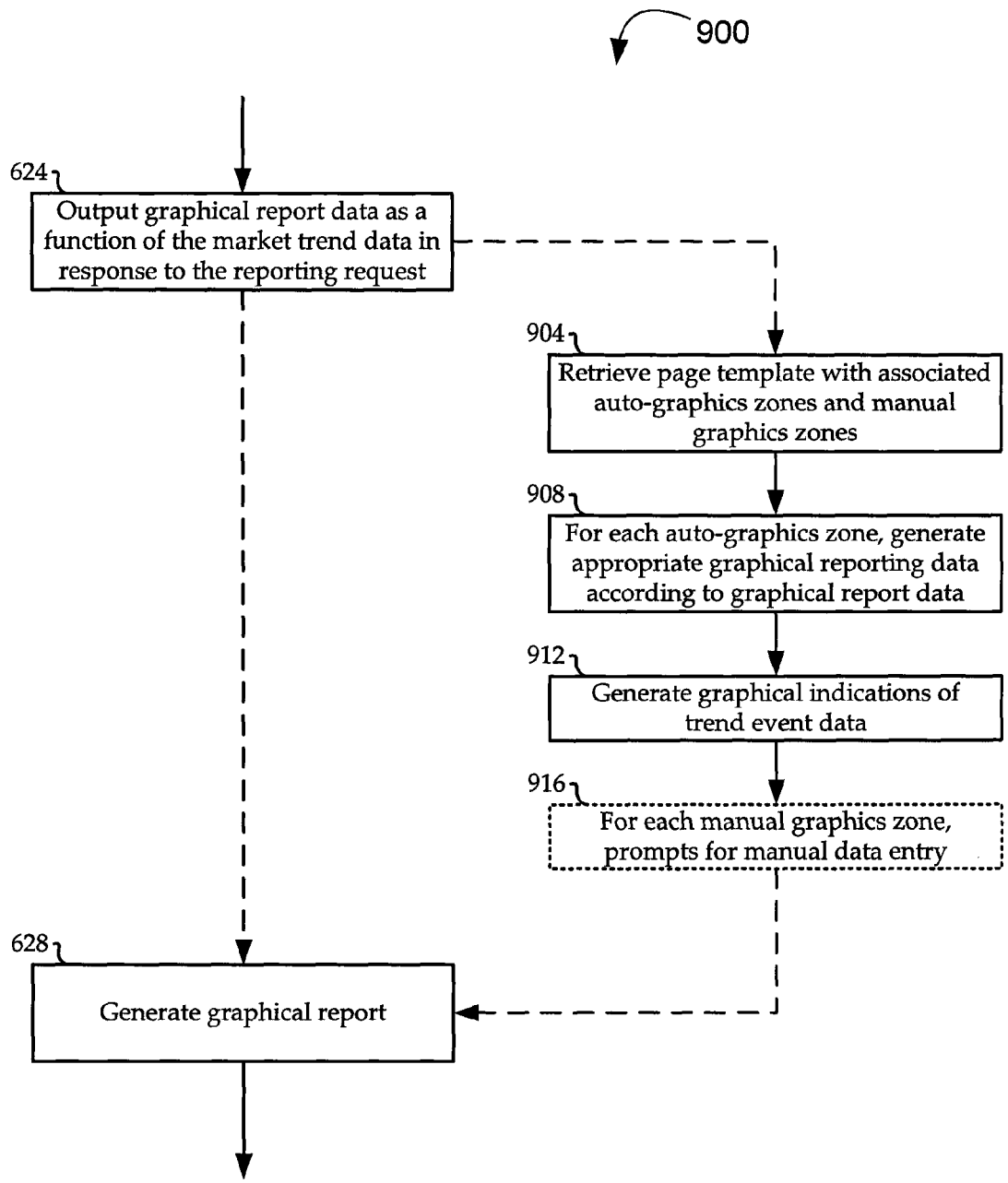
FIG. 9 shows a flow diagram of an illustrative method for outputting graphical report data, according to various embodiments.

In various embodiments, the graphical report data 260 is output according to the method 900 shown in FIG. 9. Embodiments of the method 900 begin at block 904, as one embodiment of block 624 of the method 600 of FIG. 6, by retrieving template data 290, as described above. In some embodiments, the template data 290 includes various types of zones. For example, auto-graphics zones may be used to automatically place (e.g., format, position, generate, etc.) content (e.g., text, graphics, embedded objects, etc.). Manual graphics zones may be used for manual placement of content. For example, manual placement zones may include prompts for manual input, spaces left for entry of text by analysts 165, etc. Of course, other types of zones and elements of a template are possible. For example, some templates may allow content to be manually added to auto-graphics zones, etc.

At block 908, appropriate graphical reporting data may be generated for each auto-graphics zone according to graphical report data. Graphical indications of trend event data (e.g., highlighting, icons, coloration, circles, etc.) may then be generated and/or placed at block 912. In some embodiments, at block 916, the method 900 may prompt a reporter (e.g., an analyst, etc.) for manual data entry into some or all of the manual graphics zones, where appropriate. As discussed above, in some embodiments, the graphical report data 260 may then be used to generate a graphical report, for example, according to block 628 of the method 600 of FIG. 6. For example, the report may be generated as a webpage, as a PDF document for communication over newswires, as an email, as a paper mailing, etc.

It will be appreciated that many different types of market data 250, report data 260, report outputs 400, etc. can be generated using embodiments, such as those described above. For added clarity, FIGS. 10A-10D illustrate an example of an illustrative data flow according to one embodiment. Beginning with FIG. 10A, an illustrative portion of transaction data 210 is shown.

The transaction data 210 is illustrated as a portion of a spreadsheet 1000 that includes some of the data for four merchant outlets 115 (e.g., which may correspond to four or more POS terminals 120). In particular, the data shows a Dallas-based outlet of a gas station retailer, a Boston-based outlet of a gas station retailer, a Denver-based outlet of a general merchandise retailer, and an Atlanta-based outlet of a general merchandise retailer. For each merchant outlet 115, a list of transactions and their respective dollar values are shown over a two-day timeframe.

The gas station retailer data flow is shown to proceed via arrow 1005a, and the general merchandise retailer data flow is shown to proceed via arrow 1005b. For example, at the end of each day, the indicated transactions and their respective transaction data 210 may be cleared through the POS platforms 125, payment networks 130, etc. A periodic batch process may cause the transaction data 210 to be sent to the aggregation subsystem 140 of the service provider 105 (e.g., overnight each night).

Figure 10A:
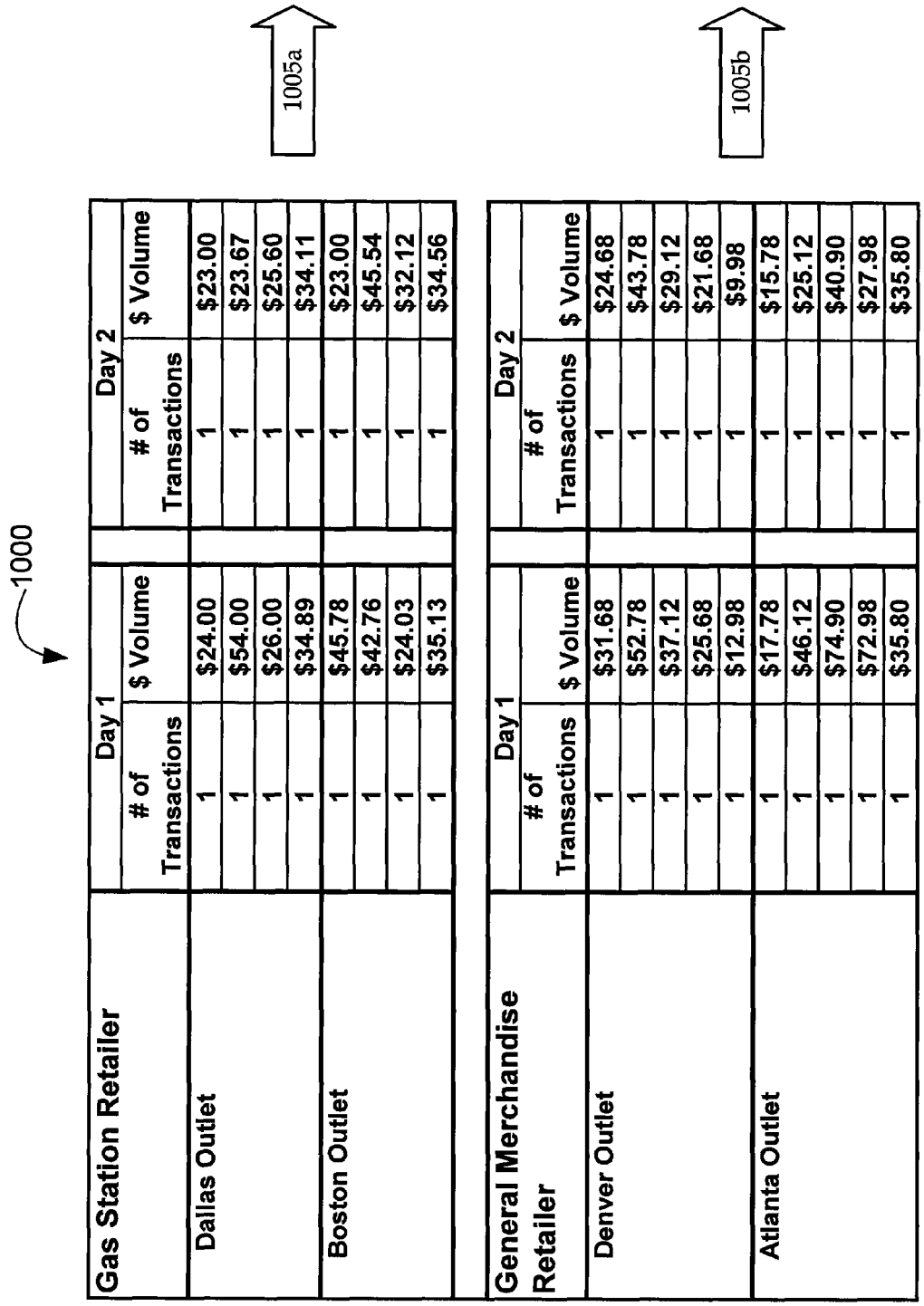
FIGS. 10A-10D illustrate an example of an illustrative data flow, according to one embodiment.
Figure 10B:
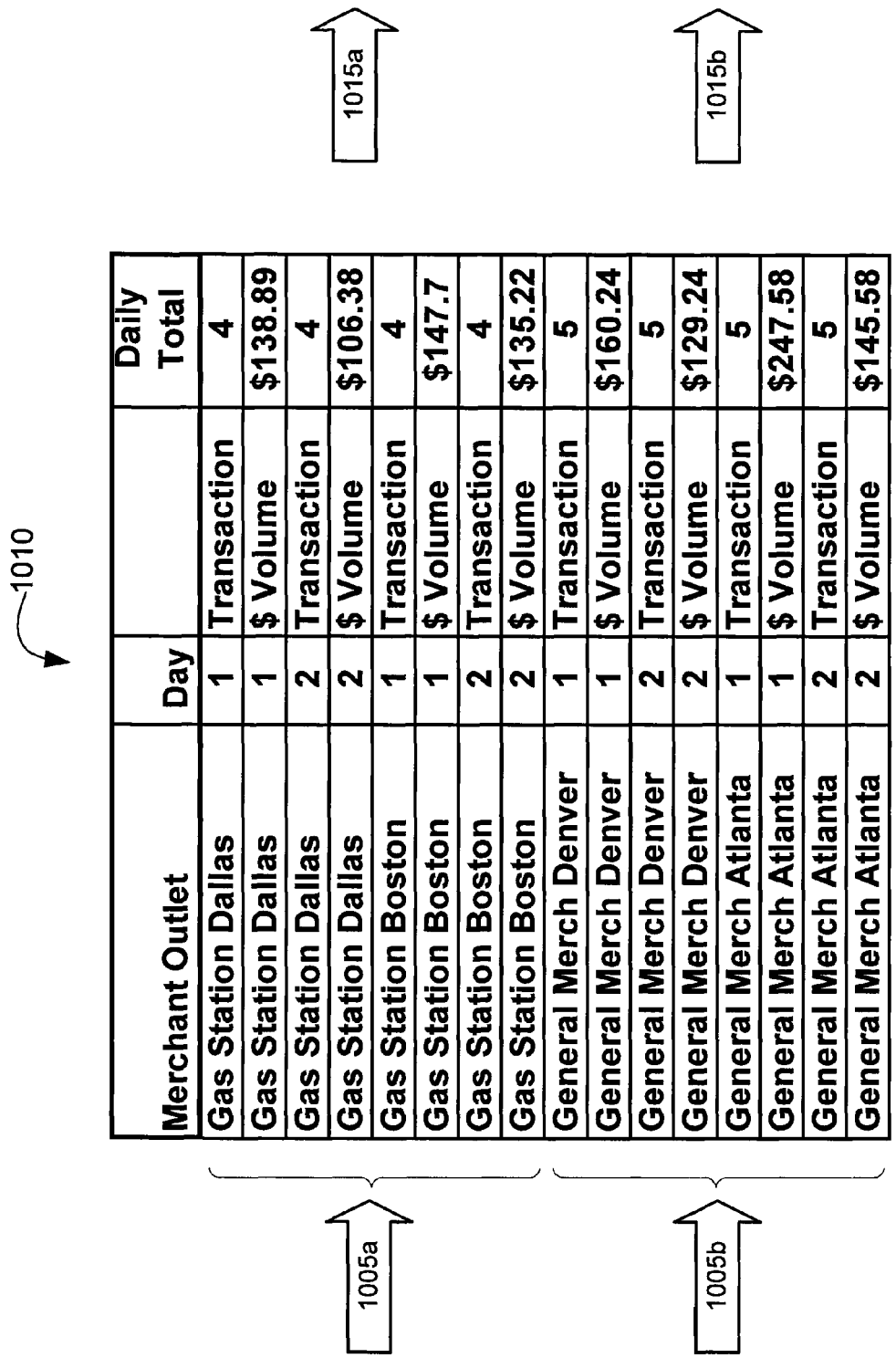

Turning to FIG. 10B, a spreadsheet 1010 is shown illustrating aggregated POS data 240 corresponding to the transaction data 210 in FIG. 10A, according to one embodiment. As described above, aggregation of the data by the aggregation subsystem 140 may include collecting the data and/or performing additional related processing. As illustrated, the transaction data 210 may be summed nightly (e.g., then monthly, by timeframe, etc., if desired). For example, the Dallas-based gas station retailer's POS terminal(s) 120 cleared four transactions totaling $138.89 on the first day of the timeframe.

Figure 10C:
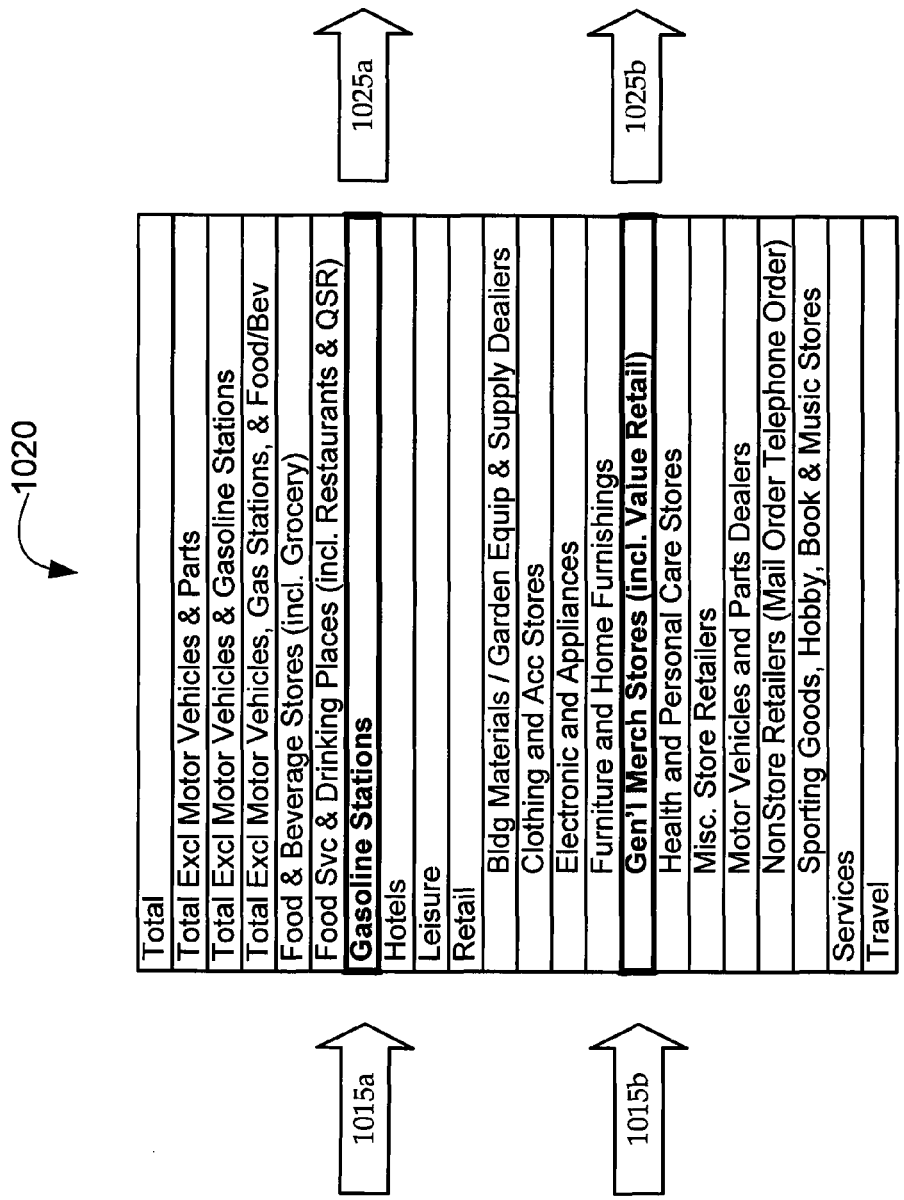

The aggregated gas station retailer data flow is shown to proceed via arrow 1015*a*, and the aggregated general merchandise retailer data flow is shown to proceed via arrow 1015*b*. The aggregated data may then be used (e.g., by the processing subsystem 150) to generate market data 250. For example, FIG. 10C shows a portion of market data 250 extracted from the aggregated data of FIG. 10B, according to one embodiment.

For example, the processing subsystem 150 may compile and analyze same store sales data, as described above, to generate relevant market data 250. The market data 250 may then include data for supporting summaries, trend generation and analysis, etc. for all the POS data (e.g., transaction data 210 and terminal data 220) by a variety of metrics, including, for example, by industry, region, state, card type, merchant, etc. The market data 250 may further indicate growth rates from a current timeframe (e.g., month) compared to a corresponding timeframe (e.g., the same month in a prior year) for average ticket, sales, transactions, etc. for each of the metrics.

Figure 10D:
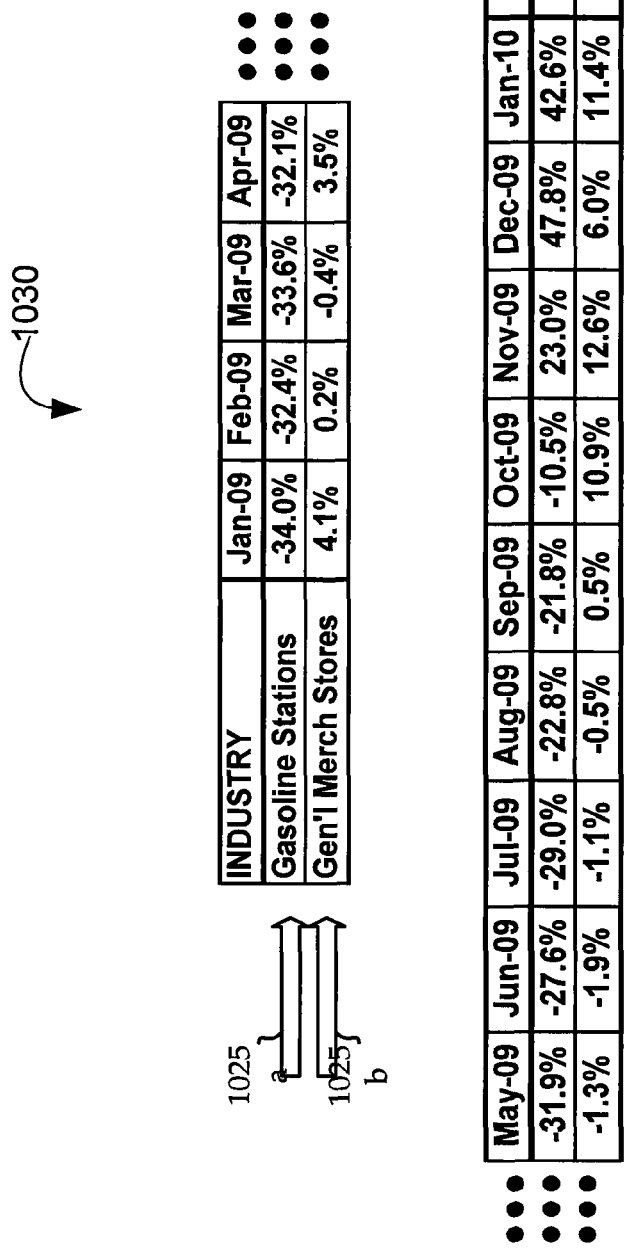

The entries for the gas station and general merchandise retailers are highlighted, and their data flows are shown to proceed according to arrows 1025. As described above, the market data 250 may be used to generate various types of report data 260. FIG. 10D shows a portion of report data 260 generated according to the market data 250 of FIG. 10C, according to one embodiment.

As illustrated, one row of the market data corresponds to the gasoline station industry, and another row corresponds to the general merchandise stores industry. Notably, the data was generated using data from only a few sample stores in the industries, and only from their actual POS terminal 120 outputs. According to the illustrative embodiment, the sales data for each of those industries, according to their respective POS terminal 120 sample sets and respective aggregated POS data 240, is compared between each month and the corresponding month from the prior year (e.g., the "Jan-09" column indicates growth data comparing January 2009 to January 2008). A 13-month trending for sales is shown, with growth rates calculated as the difference between a current month value and a same month prior year value, divided by the difference between the same month prior year value. Examples of growth rates are below. Data may also be shown by quarter (as shown), with transactions and average ticket by region, state, industry, card type, etc., and/or in any other useful way.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for market reporting according to point-of-sale (POS) data, the system comprising:

an aggregation subsystem, communicatively coupled with a POS network comprising a plurality of POS terminals, and configured to aggregate POS datasets from the plurality of POS terminals in the POS network, each POS terminal being disposed at a merchant associated with terminal data indicating at least one of a plurality of merchant identifiers and at least one of a plurality of merchant classifiers, and each POS terminal being configured to collect transaction data as a function of transactions effectuated via the POS terminal, the POS dataset for each of the POS terminals comprising the terminal data and the transaction data;

a data storage subsystem, communicatively coupled with the aggregation subsystem and configured to store the aggregated POS data from the plurality of POS terminals in the POS network, the aggregated POS data produced during a first timeframe and a second timeframe, wherein the first and second timeframes are one year apart in time;

a trend processing subsystem, communicatively coupled with the POS data store, and configured to generate a trend for a designated market based on the timeframes by:

identifying a market dataset from the aggregated POS data for the first and second timeframes, each market dataset comprising the POS datasets corresponding to the timeframe and to POS terminals having terminal data comprising a designated merchant classifier that is the same as one of the plurality of merchant classifiers that corresponds to the designated market for which the trend is sought;

identifying same store data from the POS datasets, wherein the same store data comprises data aggregated from an identical set of POS terminals or from a statistically insignificant change in a sample set;

calculating a reliable portion of the market dataset as a function of the POS datasets in the market datasets, wherein the reliable portion comprises the same store data for the first and second timeframes; and generating the market trend as a function of the reliable portion of the market datasets, wherein the market trend comprises a comparison between the reliable portion of the market datasets for the first and second timeframes, and wherein the market trend is calculated in terms of a dollar volume trend and at least two of: a geographic location of the respective merchant, an outlet identifier corresponding to an outlet of the respective merchant at which the respective POS terminal is disposed, payment types corresponding to at least some of the transactions effectuated via the respective POS terminal, transaction types corresponding to at least some of the transactions effectuated via the respective POS terminal and good-or-service classifications corresponding to at least some of the transactions effectuated via the respective POS terminal; and a reporting subsystem, communicatively coupled with the trend processing subsystem, and configured to output graphical report data as a function of the market trend generated by the trend processing system, the graphical report data configured to be displayed on a user device, wherein the reporting subsystem is further configured to output report data that illustrates a correlation between the market trend and at least two of: macroeconomic data, seasonality data, social data and a market driver.

2. The system of claim 1, wherein:

the trend processing subsystem is further configured to analyze the market trend as a function of the reliable portion of the market dataset to identify a trend event indicating a statistically significant feature of the market trend; and the reporting subsystem is further configured to output the graphical report data to graphically indicate the trend event.

3. The system of claim 2, wherein:

the trend processing subsystem is further configured to receive supplemental reporting data from an analyst in response to identifying the trend event; and the reporting subsystem is further configured to output the graphical report data to include the supplemental reporting data.

4. The system of claim 2, wherein the trend processing subsystem is further configured to:

for each merchant identifier associated with at least one of the POS datasets from the reliable portion of the market dataset, calculate a merchant contribution representing a contributing effect on the trend event attributable to the POS datasets associated with the merchant identifier; and generating the merchant driver by identifying at least one merchant contribution as indicating a statistically significant contributing effect on the trend event attributable to the corresponding merchant identifier.

5. The system of claim 4, wherein the reporting subsystem is further configured to:

output the graphical report data to indicate the merchant driver.

6. The system of claim 2, further comprising:

a macroeconomic data store configured to store macroeconomic data corresponding to at least a portion of the timeframe, wherein the trend processing subsystem is further communicatively coupled with the macroeconomic data store and is further configured to determine a correlation between the trend event and the macroeconomic data, and wherein the reporting subsystem is further configured to output the graphical report data to indicate the correlation.

7. The system of claim 6, further comprising:

the macroeconomic data store is further configured to store the macroeconomic data in association to geographic data corresponding to geographic regions associated with at least one of the POS datasets from the reliable portion of the market dataset, such that the correlation between the trend event and seasonality data indicates a further correlation between the trend event and the macroeconomic data associated with at least one geographic region.

8. The system of claim 6, further comprising:

the macroeconomic data store is further configured to store the macroeconomic data in association to merchant identifiers associated with at least one of the POS datasets from the reliable portion of the market dataset, such that the correlation between the trend event and seasonality data indicates a further correlation between the trend event and the macroeconomic data associated with at least one of the merchant identifiers.

9. The system of claim 6, wherein the macroeconomic data is selected from a group consisting of:

gross domestic product data;
unemployment data;
personal bankruptcy data; and
consumer debt data.

10. The system of claim 2, further comprising:

a seasonality data store configured to store seasonality data corresponding to at least a portion of the timeframe, wherein the trend processing subsystem is further communicatively coupled with the seasonality data store and is further configured to determine a correlation between the trend event and the seasonality data, and wherein the reporting subsystem is further configured to output the graphical report data to indicate the correlation.

11. The system of claim 10, wherein:

the seasonality data store is further configured to store the seasonality data in association to merchant identifiers associated with at least one of the POS datasets from the reliable portion of the market dataset, such that the correlation between the trend event and the seasonality data indicates a further correlation between the trend event and the seasonality data associated with at least one of the merchant identifiers.

12. The system of claim 2, further comprising:

a social data store configured to store social data indicating social trends or events occurring during at least a portion of the timeframe affecting at least one of the merchant identifiers associated with at least one of the POS datasets from the reliable portion of the market dataset, wherein the trend processing subsystem is further communicatively coupled with the social data store and is further configured to determine a correlation between the trend event and the social data, such that the correlation between the trend event and the social data indicates an effect on the trend event attributable to the social trends or events affecting at least one of the merchant identifiers, and wherein the reporting subsystem is further configured to output the graphical report data to indicate the correlation.

13. The system of claim 1, wherein the trend processing subsystem is configured to calculate the reliable portion of the market dataset by:

determining, for each of the POS datasets, transaction dates corresponding to the transaction data for the transactions effectuated via the respective POS terminal, such that the reliable portion of the market dataset includes only the POS datasets comprising transaction data for transactions having transaction dates occurring over the entire timeframe.

14. The system of claim 1, wherein the trend processing subsystem is configured to calculate the reliable portion of the market dataset by:
- identifying a POS baseline corresponding to a subset of the POS datasets in the market dataset; and
- calculating a statistical variation between the POS baseline and the subset of the POS datasets, such that the subset of POS datasets is added to the reliable portion of the market dataset only when the statistical variation is less than a threshold level.

15. The system of claim 1, wherein:
the trend processing subsystem is further configured to generate the market trend as a function of data from the POS datasets indicating
an average ticket amount corresponding to at least some of the transactions effectuated via the respective POS terminal.

16. A method for market reporting according to point-of-sale (POS) data, the method comprising:
- aggregating POS datasets from a plurality of POS terminals in a POS network, each POS terminal being disposed at a merchant associated with terminal data indicating at least one of a plurality of merchant identifiers and at least one of a plurality of merchant classifiers, and each POS terminal being configured to collect transaction data as a function of transactions effectuated via the POS terminal, the POS dataset for each of the POS terminals comprising the terminal data and the transaction data;
- storing in a database of a computer system the aggregated POS data from the POS terminals produced during a first and a second timeframe, wherein the first and second timeframes are one year apart in time;
- receiving a reporting request for a market trend report corresponding to a designated market based on the timeframes;
- using a processor of the computer system, identifying a market dataset from the aggregated POS data for the first and second timeframes, each market dataset comprising the POS datasets corresponding to the timeframe and to POS terminals having terminal data comprising a designated merchant classifier that is the same as one of the plurality of merchant classifiers that corresponds to the designated market for which the trend is sought;
- identifying same store data from the POS datasets, wherein the same store data comprises data aggregated from an identical set of POS terminals or from a statistically insignificant change in a sample set;
- calculating a reliable portion of the market dataset as a function of the POS datasets in the market datasets, wherein the reliable portion comprises the same store data for the first and second timeframes; and
- generating the market trend as a function of the reliable portion of the market datasets, wherein the market trend comprises a comparison between the reliable portion of the market datasets for the first and second timeframes, and wherein the market trend is calculated in terms of a dollar volume trend and at least two of: a geographic location of the respective merchant, an outlet identifier corresponding to an outlet of the respective merchant at which the respective POS terminal is disposed, payment types corresponding to at least some of the transactions effectuated via the respective POS terminal, transaction types corresponding to at least some of the transactions effectuated via the respective POS terminal and goods-or-service classifications corresponding to at least some of the transactions effectuated via the respective POS terminal; and
- outputting graphical report data as a function of the market trend data in response to the reporting request, wherein a reporting subsystem is further configured to output report data that illustrates a correlation between the market trend and at least two of: macroeconomic data, seasonality data, social data and a market driver.

17. The method of claim 16, wherein:
the reporting request is received from a user device; and
outputting the graphical report data comprises configuring the graphical report data for display on the user device and communicating the graphical report data over a network to the user device.

18. The method of claim 16, further comprising:
analyzing the market trend as a function of the reliable portion of the market dataset to identify a trend event indicating a statistically significant features of the market trend; and
configuring the graphical report data to graphically indicate the trend event.

19. The method of claim 18, further comprising:
receiving supplemental reporting data from an analyst in response to identifying the trend event,
wherein the graphical report data comprises the supplemental reporting data.

20. The method of claim 18, further comprising:
calculating, for each merchant identifier associated with at least one of the POS datasets from the reliable portion of the market dataset, a merchant contribution representing a contributing effect on the trend event attributable to the POS datasets associated with the merchant identifier; and
generating the merchant driver by identifying at least one merchant contribution as indicating a statistically significant contributing effect on the trend event attributable to the corresponding merchant identifier.

21. The method of claim 18, further comprising:
retrieving macroeconomic data corresponding to at least a portion of the timeframe; and
determining a correlation between the trend event and the macroeconomic data,
wherein the graphical report data comprises an indication of the correlation.

22. The method of claim 18, further comprising:
retrieving seasonality data corresponding to at least a portion of the timeframe; and
determining a correlation between the trend event and the seasonality data,
wherein the graphical report data comprises an indication of the correlation.

23. The method of claim 18, further comprising:
retrieving social data indicating social trends or events occurring during at least a portion of the timeframe affecting at least one of the merchant identifiers associated with at least one of the POS datasets from the reliable portion of the market dataset; and
determining a correlation between the trend event and the social data, such that the correlation between the trend event and the social data indicates an effect on the trend event attributable to the social trends or events affecting at least one of the merchant identifiers,
wherein the graphical report data comprises an indication of the correlation.

24. The method of claim 16, wherein calculating the reliable portion of the market dataset comprises:
  determining, for each of the POS datasets, transaction dates corresponding to the transaction data for the transactions effectuated via the respective POS terminal, such that the reliable portion of the market dataset includes only the POS datasets comprising transaction data for transactions having transaction dates occurring over the entire timeframe.

25. The method of claim 16, wherein calculating the reliable portion of the market dataset comprises:
  identifying a POS baseline corresponding to a subset of the POS datasets in the market dataset; and
  calculating a statistical variation between the POS baseline and the subset of the POS datasets, such that the subset of POS datasets is added to the reliable portion of the market dataset only when the statistical variation is less than a threshold level.

26. A machine-readable medium for market reporting according to point-of-sale (POS) data, the machine-readable medium having instructions stored thereon which, when executed by a machine, cause the machine to perform steps comprising:
  receiving a reporting request for a market trend report corresponding to a designated market based on the timeframes;
  identifying a market dataset from POS datasets, for a first and second timeframe, aggregated from a plurality of POS terminals in a POS network, each POS terminal being disposed at a merchant associated with terminal data indicating at least one of a plurality of merchant identifiers and at least one of a plurality of merchant classifiers, and each POS terminal being configured to collect transaction data as a function of transactions effectuated via the POS terminal, the POS dataset for each of the POS terminals comprising the terminal data and the transaction data, each market dataset comprising the POS datasets corresponding to the respective timeframe and to POS terminals having terminal data comprising a designated merchant classifier that is the same as one of the plurality of merchant classifiers that corresponds to the designated market for which the market trend is sought;
  identifying same store data from the POS datasets, wherein the same store data comprises data aggregated from an identical set of POS terminals or from a statistically insignificant change in a sample set;
  calculating a reliable portion of the market dataset as a function of the POS datasets in the market datasets, wherein the reliable portion comprises the same store data for the first and second timeframes; and
  generating the market trend as a function of the reliable portion of the market datasets, wherein the market trend comprises a comparison between the reliable portion of the market datasets for the first and second timeframes, and wherein the market trend is calculated in terms of a dollar volume trend and at least two of: a geographic location of the respective merchant, an outlet identifier corresponding to an outlet of the respective merchant at which the respective POS terminal is disposed, payment types corresponding to at least some of the transactions effectuated via the respective POS terminal, transaction types corresponding to at least some of the transactions effectuated via the respective POS terminal and good-or-service classifications corresponding to at least some of the transactions effectuated via the respective POS terminal; and
  outputting graphical report data as a function of the market trend data in response to the reporting request, wherein a reporting subsystem is further configured to output report data that illustrates a correlation between the market trend and at least two of: macroeconomic data, seasonality data, social data and a market driver.

* * * * *